US009887618B2

United States Patent
Cui et al.

(10) Patent No.: US 9,887,618 B2
(45) Date of Patent: Feb. 6, 2018

(54) POWER SUPPLY DEVICE SENSING AC-OFF STATE

(71) Applicant: MagnaChip Semiconductor, Ltd., Cheongju-si (KR)

(72) Inventors: Zhi Yuan Cui, Cheongju-si (KR); James Jung, Cheongju-si (KR); Hae Wook Kim, Cheongju-si (KR); Young Gi Ryu, Cheongju-si (KR); Julie Jang, Cheongju-si (KR)

(73) Assignee: Magnachip Semiconductor, Ltd., Cheongju-si (KR)

( * ) Notice: Subject to any disclaimer, the term of this patent is extended or adjusted under 35 U.S.C. 154(b) by 186 days.

(21) Appl. No.: 14/258,626

(22) Filed: Apr. 22, 2014

(65) Prior Publication Data

US 2015/0003123 A1   Jan. 1, 2015

(30) Foreign Application Priority Data

Jun. 28, 2013   (KR) .................. 10-2013-0075966

(51) Int. Cl.
*H02M 1/36* (2007.01)
*H02M 1/32* (2007.01)
*H02M 3/335* (2006.01)

(52) U.S. Cl.
CPC ............ *H02M 1/36* (2013.01); *H02M 1/32* (2013.01); *H02M 3/335* (2013.01)

(58) Field of Classification Search
CPC ... H02M 2001/007; H02M 2001/0006; H02M 1/36; H02M 1/32; H02H 7/1213; H02H 7/125; H02H 7/12; H02H 1/06; H02H 3/24; H02H 3/247
See application file for complete search history.

(56) References Cited

U.S. PATENT DOCUMENTS

| 7,952,859 | B2 | 5/2011 | Peng | |
|---|---|---|---|---|
| 7,995,359 | B2 | 8/2011 | Djenguerian et al. | |
| 2009/0268488 | A1* | 10/2009 | Fujii | H02M 1/32 363/49 |
| 2010/0259952 | A1* | 10/2010 | Zhu | H02M 1/36 363/20 |
| 2011/0069420 | A1* | 3/2011 | Chiu | H02M 1/36 361/91.1 |
| 2011/0255310 | A1 | 10/2011 | Djenguerian et al. | |
| 2012/0044230 | A1* | 2/2012 | Lee | H02M 1/32 345/211 |
| 2012/0106215 | A1* | 5/2012 | Chia | H02M 1/32 363/124 |

(Continued)

FOREIGN PATENT DOCUMENTS

WO   WO2012140840 A1 * 10/2012 ............ H02M 7/217

*Primary Examiner* — Harry Behm
(74) *Attorney, Agent, or Firm* — NSIP Law

(57) ABSTRACT

There is provided a power supply device sensing an AC-off state. The power supply device includes a rectifier configured to rectify AC power into DC power, a transformer configured to supply output voltage by converting voltage of the DC power rectified by the rectifier, and a Pulse Width Modulation (PWM) control module configured to output voltage by switching a power switching device connected to the transformer, configured to drive the power supply device by connecting power of an HV pin to a VCC pin, and configured to determine an AC-off state by sensing voltage rectified by the rectifier.

21 Claims, 2 Drawing Sheets

(56) References Cited

U.S. PATENT DOCUMENTS

| | | | | |
|---|---|---|---|---|
| 2012/0195075 A1* | 8/2012 | Nate | ................ | H02M 3/33553 |
| | | | | 363/21.01 |
| 2012/0313616 A1* | 12/2012 | Lee | ..................... | H02M 1/126 |
| | | | | 323/312 |
| 2013/0049706 A1* | 2/2013 | Huang | ................... | H02M 1/32 |
| | | | | 320/166 |
| 2013/0242626 A1* | 9/2013 | Li | ........................ | H02M 1/36 |
| | | | | 363/50 |
| 2014/0036561 A1* | 2/2014 | Sakurai | ............... | H02M 7/217 |
| | | | | 363/126 |

\* cited by examiner

POWER SUPPLY DEVICE SENSING AC-OFF STATE

CROSS-REFERENCE TO RELATED APPLICATIONS

This application claims the benefit under 35 U.S.C. § 119(a) of Korean Patent Application No. 10-2013-0075966 filed on Jun. 28, 2013, in the Korean Intellectual Property Office, the entire disclosure of which is incorporated herein by reference for all purposes.

BACKGROUND

1. Field

The following description relates to a power supply device. The following description also relates to a power supply device that senses an AC-off state in which the driving power of the power supply device is reset, by sensing the AC-off state of an input terminal.

2. Description of Related Art

A power supply device, more specifically a switching mode power supply, refers to a device that converts and then supplies power required for driving various electronic devices such as a computer and a TV. Broadly, devices such as a transformer, a rotary converter, a mercury rectifier, and other similar devices are power supply devices. However, recently, a power converter refers to a semiconductor power converter using semiconductor hardware to act as a power converter.

For example, a power supply device may convert alternating current (AC) into direct current (DC) by Pulse Width Modulation (PWM) control.

FIG. 1 is a block diagram illustrating a power supply device by PWM control.

The power supply device illustrated in the figure in FIG. 1, a power supply device by PWM control applied for Liquid-Crystal Display (LCD) TVs, is structured to achieve high speed while minimizing power consumption.

To this end, the power supply device includes, as illustrated in FIG. 1, a bridge rectifier 10 that rectifies AC into DC, a Power Factor Correction (PFC) 20 reducing a ripple of input power, a PWM controller 30 converting power, a main board 40 supplied with the converted power, and common Light-Emitting Diode (LED) driver 50 and LCD module 60.

The power supply device that has this configuration has a function of entering into its normal operational mode, in which the driving power of the power supply device is reset, by sensing an AC-off state.

For example, when the power supply device is operating abnormally, a user can temporarily cut the AC power and then supply power again by pulling out a power plug and subsequently putting it in again. In this process, the power supply device is made to normally operate by sensing the AC-off state and then resetting the driving power for the power supply device.

However, the power supply device of FIG. 1 presents an issue in that because it senses the AC-off state by detecting only any one of two input lines for AC power, it fails to accurately sense the AC-off state. For example, the power supply device of FIG. 1 may lack the capability to properly handle the (+) or (−) half period in which AC power is supplied. Accordingly, the entire power of the device is not reset and the device remains in an abnormal state.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a power supply device includes a rectifier configured to rectify AC power into DC power, a transformer configured to supply output voltage by converting voltage of the DC power rectified by the rectifier, and a Pulse Width Modulation (PWM) control module configured to output voltage by switching a power switching device connected to the transformer, configured to drive the power supply device by connecting power of an HV pin to a VCC pin, and configured to determine an AC-off state by sensing voltage rectified by the rectifier.

The PWM control module may be configured to reset driving power of the power supply device in an AC-off state, and is configured to keep the power supply device in a normal operation in an AC-on state, in accordance with a result of determining whether the power supply device is an AC-off state.

The power supply device may further include a first capacitor with one end connected to the VCC pin of the PWM control module.

The rectifier may be a full-wave rectifier circuit.

The rectifier may be a half-wave rectifier circuit.

The PWM control module may include a switch connected between the VCC pin and a power device connected to the HV pin, a controller configured to sense the voltage of the VCC pin, configured to turn off the switch when the voltage is a reference value or more, and configured to supply the HV voltage to the VCC pin by turning on the switch when the voltage is less than the reference value, and an AC-off detector configured to sense an AC-off state from the HV pin connected through the power device.

The AC-off detector may include a second capacitor connected to the power device in series and configured to discharge a charged voltage in response to the voltage of the HV pin dropping to a reference value or less, a power source configured to supply current to the second capacitor, and a comparator configured to output an AC-off signal in response to a source voltage of the power device dropping to a reference voltage or less.

The PWM control module may be a monolithic integrated circuit.

The power switching device may be a Metal Oxide Silicon Field Effect Transistor (MOSFET).

The power supply device may be a Switching Mode Power Supply (SMPS).

The AC-off state determined by the PWM control module may include a short state of any one phase or short states of both phases of a plurality of AC input lines.

In another general aspect, a Pulse Width Modulation (PWM) control module for use in a power supply device includes a switch connected between a VCC pin and a power device connected to an HV pin, a controller configured to sense the voltage of the VCC pin, configured to turn off the switch when the voltage is a reference value or more, and configured to supply the HV voltage to the VCC pin by turning on the switch when the voltage is less than the reference value, and an AC-off detector configured to sense an AC-off state from the HV pin connected through the power device.

The PWM control module may be configured to output voltage by switching a power switching device connected to a transformer, configured to drive the power supply device by connecting power of the HV pin to the VCC pin, and configured to determine an AC-off state by sensing voltage rectified by the rectifier.

The transformer may be configured to supply output voltage by converting voltage of DC power rectified by a rectifier configured to rectify AC power into DC power.

The rectifier may be a full-wave rectifier circuit.

The PWM control module may be configured to reset driving power of the power supply device in an AC-off state, and may be configured to keep the power supply device in a normal operation in an AC-on state, in accordance with a result of determining whether the power supply device is an AC-off state.

The AC-off detector may include a second capacitor connected to the power device in series and configured to discharge a charged voltage in response to the voltage of the HV pin dropping to a reference value or less, a power source configured to supply current to the second capacitor; and a comparator configured to output an AC-off signal in response to a source voltage of the power device dropping to a reference voltage or less.

The AC-off state determined by the PWM control module may include a short state of any one phase or short states of both phases of a plurality of AC input lines.

The PWM control module may be a monolithic integrated circuit.

Other features and aspects will be apparent from the following detailed description, the drawings, and the claims.

Figure 1:
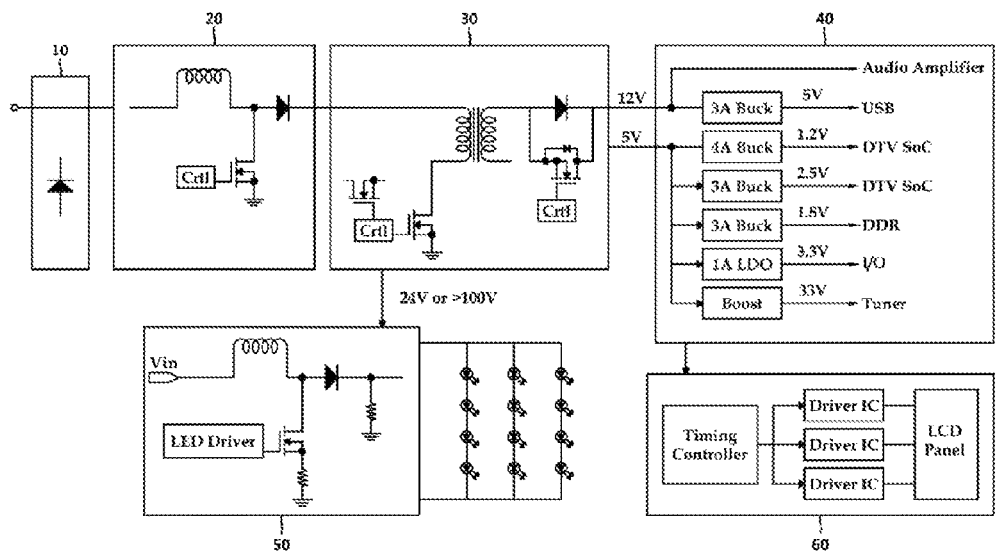
FIG. 1 is a block diagram illustrating a power supply device by PWM control.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Hereinafter, various examples will be described with reference to the accompanying drawings.

Figure 2:
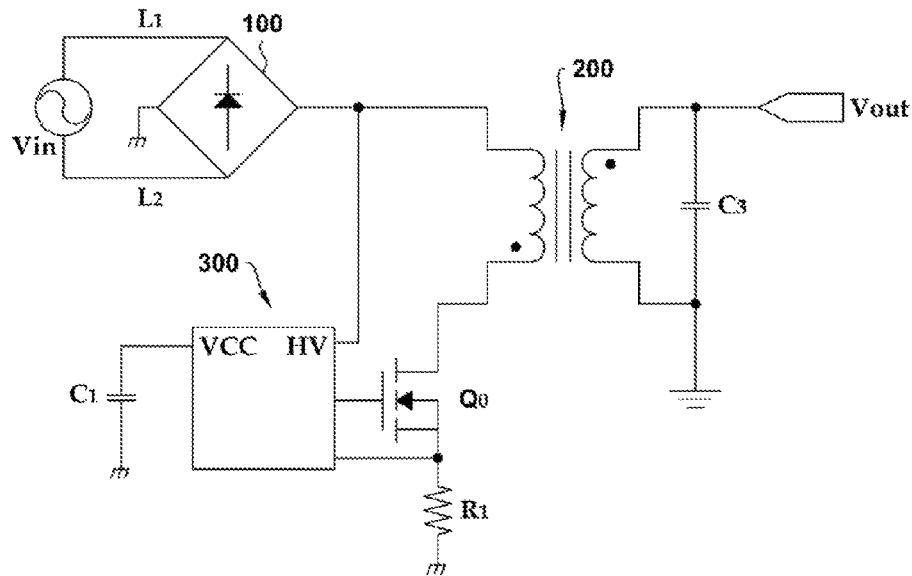
FIG. 2 is a block diagram illustrating a power supply device, which senses an AC-off state, according to an example.

FIG. 2 is a block diagram illustrating a power supply device, which senses an AC-off state, according to an example.

As illustrated in FIG. 2, a power supply device that senses an AC-off state according to an example includes several elements, that are as follows. A rectifier 100 rectifies AC power into DC power. A transformer 200 supplies output voltage by converting the voltage of the DC power rectified by the rectifier 100. A PWM control module 300 controls the output voltage by switching a power switching device (Q0) connected to the transformer 200, drives the power supply device by connecting the power of an HV pin (HV) to a VCC pin (VCC), and determines an AC-off state by sensing the voltage rectified by the rectifier 100.

In examples, a full-wave rectifier circuit or half-wave rectifier circuit is used for the rectifier 100 that rectifies AC voltage of two AC input lines (L1 and L2) of an input terminal ($V_{IN}$) into DC voltage, and accordingly, the DC voltage rectified by the rectifier 100 is half-wave rectified voltage or full-wave rectified voltage, depending on the type of rectifier circuit that is used as the rectifier 100.

The PWM control module 300 is connected to the power switching device (Q0) connected to a primary winding of the transformer 200. For example, the power switching device (Q0) is a MOSFET (Metal Oxide Silicon Field Effect Transistor).

For example, the rectifier 100 is connected to the primary side of the transformer 200 and the loads of the main board 40, the LED driver 50, and the LCD module 60 are connected to the secondary output terminal ($V_{OUT}$) of the transformer 200.

In an example, the PWM control module 300 is manufactured into a monolithic integrated circuit and forms the entirety or a portion of the integrated circuit.

The PWM control module 300 controls the power transmitted from the input terminal ($V_{IN}$) of the power converter to the load connected to the output terminal ($V_{OUT}$) through the transformer 200. Thus, the PWM control module 300 controls the voltage at the output terminal ($V_{OUT}$) of the power converter by switching the power switching device (Q0) in response to a feedback signal as part of the operation of the PWM.

When the power switching device (Q0) is turned on, energy is stored in the primary winding of the transformer 200 from the input terminal ($V_{IN}$). By contrast, when the power switching device (Q0) is turned off, the energy stored in the primary winding is transmitted to the second winding and the controlled power is supplied to the load connected to the output terminal ($V_{OUT}$). In this manner, the transformer 200 controls the magnitude of the output voltage by controlling an input/output winding ratio.

In the operation of the PWM control module 300 for determining an AC-off state in accordance with an example, the PWM control module 300 resets the driving power of the power supply device in an AC-off state and keeps the power supply device in the normal operation in an AC-on state, in accordance with whether the power supply device is in an AC-off state.

A first capacitor (C1) with one end connected to the VCC pin (VCC) of the PWM control module 300 is further included. The first capacitor (C1) has a capacity that is suitable for maintaining the VCC voltage.

Hence, in an example, the power supply device of the example is able to control output voltage, using a pulse width modulation technique.

Figure 3:
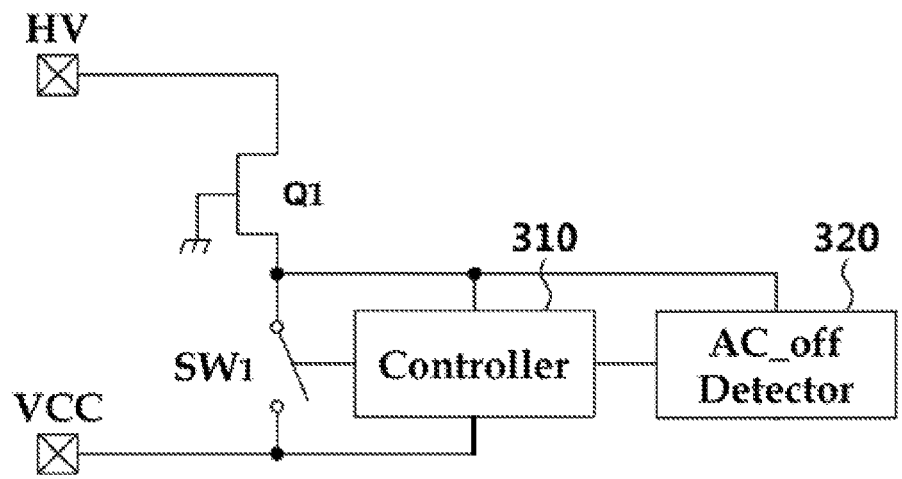
FIG. 3 is a block diagram illustrating in more detail the PWM control module of the example illustrated in FIG. 2.
Figure 4:
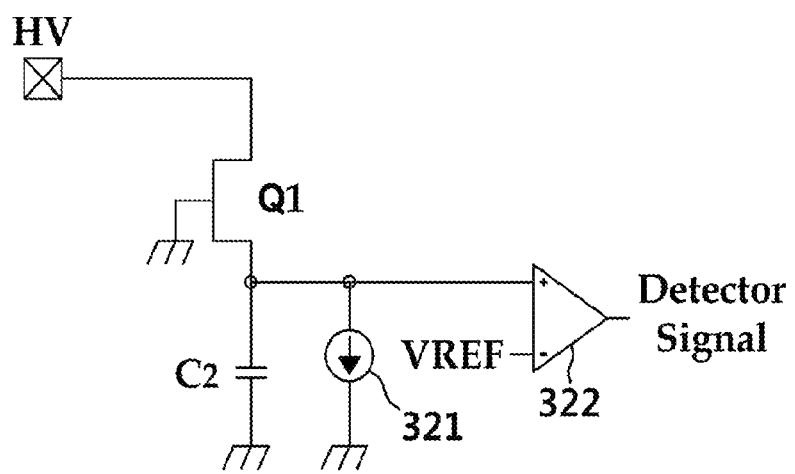
FIG. 4 is a block diagram illustrating in more detail the AC-off detector illustrated in FIG. 3.

FIG. 3 is a block diagram illustrating in more detail the PWM control module of the example illustrated in FIG. 2 and FIG. 4 is a block diagram illustrating in more detail the AC-off detector illustrated in FIG. 3.

As illustrated in the figures, the PWM control module 300 of the power supply device that senses an AC-off state according to an example includes several elements, which are as follows. A switch (SW1) is located between the VCC pin VCC and a power device (Q1) is connected to the HV pin (HV). A controller 310 senses the voltage of the VCC pin (VCC), turns off the switch (SW1) when the voltage is a reference value or more, and supplies the HV voltage to the VCC pin (VCC) by turning on the switch (SW1) when the voltage is less than the reference value. An AC-off detector 320 senses an AC-off state from the HV pin (HV) connected through the power device (Q1).

The AC-off detector 320 includes a second capacitor (C2) that is connected to the power device (Q1) in series and that discharges a charged voltage when the voltage of the HV pin (HV) drops to a reference value or less. A power source 321 supplies current to the second capacitor (C2). A comparator 322 outputs an AC-off signal when the source voltage of the power device (Q1) drops to a reference voltage (VREF) or less.

Accordingly, the examples make it possible to more accurately sense an AC-off state and minimize the possibility of abnormal operation of a power supply device. The examples achieve this feature by sensing the AC-off state from the voltage rectified by the rectifier 100, resetting the driving power of the power supply device, and then implementing normal operation.

Examples detect the AC-off state determined by the PWM control module 300. Examples are able to detect AC-off states including all of the short state of any single phase, or the short states of both phases of the plurality of AC input lines (L1 and L2).

In an example, PWM control module 300 is a monolithic integrated circuit.

The power supply device of examples is used for various types of power supply devices, which include various types of switching mode power supplies or SMPS. The switching mode power supply types include a flyback type, a forward type, an LLC type, or a Cuk type.

As another example, the PWM control module 300 further includes a timer (not illustrated) that counts the discharge time of the second capacitor (C2). The timer is able to help the power supply device normally operate by resetting the driving power of the power supply device when a predetermined time is counted, regardless of sensing the AC-off state.

Therefore, the power supply device senses an AC-off state of examples. Hence, the power supply device is made to normally operate by sensing an AC-off state from the voltage rectified by a rectifier and resetting the driving power of the power supply device. Hence, in examples, it is possible to minimize the possibility of abnormal operation by more accurately sensing the AC-off state.

The apparatuses and units described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a hardware component may include multiple processors or a processor and a controller. In addition, different processing configurations are possible, such as parallel processors.

As a non-exhaustive illustration only, a terminal/device/unit described herein may refer to mobile devices such as, for example, a cellular phone, a smart phone, a wearable smart device (such as, for example, a ring, a watch, a pair of glasses, a bracelet, an ankle bracket, a belt, a necklace, an earring, a headband, a helmet, a device embedded in the cloths or the like), a personal computer (PC), a tablet personal computer (tablet), a phablet, a personal digital assistant (PDA), a digital camera, a portable game console, an MP3 player, a portable/personal multimedia player (PMP), a handheld e-book, an ultra mobile personal computer (UMPC), a portable lab-top PC, a global positioning system (GPS) navigation, and devices such as a high definition television (HDTV), an optical disc player, a DVD player, a Blu-ray player, a setup box, or any other device capable of wireless communication or network communication consistent with that disclosed herein. In a non-exhaustive example, the wearable device may be self-mountable on the body of the user, such as, for example, the glasses or the bracelet. In another non-exhaustive example, the wearable device may be mounted on the body of the user through an attaching device, such as, for example, attaching a smart phone or a tablet to the arm of a user using an armband, or hanging the wearable device around the neck of a user using a lanyard.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A power supply device, comprising:
a rectifier configured to rectify AC power into DC power;
a transformer configured to supply output voltage by converting voltage of the DC power rectified by the rectifier; and a Pulse Width Modulation (PWM) control module configured to determine an AC-off state, from a loss of AC power, based on a sensed voltage rectified by the rectifier,
wherein the PWM control module comprises
a power device directly connected to the DC voltage rectified by the rectifier,
an AC-off detector configured to sense the AC-off state through the power device, and
an AC-off detector capacitor connected in series with the power device and configured to discharge a charged voltage based on the sensed voltage rectified by the rectifier.

2. The power supply device of claim 1, wherein the PWM control module is further configured to reset a driving power of the power supply device based on the determination that the sensed voltage indicates the AC-off state, and keep the power supply device in a normal operation based on a determination that the sensed voltage indicates an AC-on state.

3. The power supply device of claim 2, wherein the PWM control module further comprises: a switch connected between a VCC pin and an HV pin, the switch configured to supply an HV voltage to the VCC pin when turned on; and
a controller configured to sense the voltage of the VCC pin, turn off the switch based on the VCC voltage being greater than or equal to a reference value, and turn on the switch based on the VCC voltage being less than the reference value,
wherein the power device is connected between the switch and the HV pin, and
the AC-off detector is further configured to sense an AC-off state from the HV pin connected through the power device.

4. The power supply device of claim 1, further comprising a capacitor with one end connected to a VCC pin of the PWM control module, and
wherein the PWM control module is further configured to output voltage by switching a power switching device connected to the transformer, and drive the power supply device by connecting power of an HV pin to the VCC pin.

5. The power supply device of claim 1, wherein the rectifier is a full-wave rectifier circuit.

6. The power supply device of claim 1, wherein the rectifier is a half-wave rectifier circuit.

7. The power supply device of claim 1, wherein the PWM control module further comprises: a switch connected between a VCC pin and an HV pin, wherein the switch is configured to supply an HV voltage to the VCC pin when turned on; and
a controller configured to sense the voltage of the VCC pin, turn off the switch based on the VCC voltage being greater than or equal to a reference value, and turn on the switch based on the VCC voltage being less than the reference value.

8. The power supply device of claim 7, wherein the AC-off detector comprises:
a power source configured to supply current to the AC-off detector capacitor; and
a comparator configured to output an AC-off signal based on a source voltage of the power device being less than or equal to a reference voltage.

9. The power supply device of claim 1, wherein the PWM control module is a monolithic integrated circuit.

10. The power supply device of claim 1, wherein the PWM control module is further configured to output voltage by switching a power switching device connected to the transformer, and to drive the power supply device by connecting power of an HV pin to the VCC pin, and
wherein the power switching device is a Metal Oxide Silicon Field Effect Transistor (MOSFET).

11. The power supply device of claim 1, wherein the power supply device is a Switching Mode Power Supply (SMPS).

12. The power supply device of claim 1, wherein the AC-off state determined by the PWM control module comprises a short state of any one phase or short states of both phases of a plurality of AC input lines.

13. A Pulse Width Modulation (PWM) control module for use in a power supply device, comprising:
a power device connected between an HV pin and a VCC pin;
a switch configured to selectively and directly connect between a terminal of the power device and the VCC pin;
an AC-off detector configured to sense an AC-off state based on a voltage at the terminal of the power device; and
an AC-off detector capacitor or connected in series with the power device and configured to discharge a charged voltage based on the voltage of the HV pin being less than or equal to a reference value.

14. The PWM control module of claim 13, wherein the PWM control module is configured to control an output voltage by switching a power switching device connected to a transformer, drive the power supply device by connecting power of the HV pin to the VCC pin, and determine the AC-off state based on a sensed voltage rectified by a rectifier.

15. The PWM control module of claim 14, wherein the transformer is configured to supply the output voltage by converting voltage of DC power rectified by the rectifier.

16. The power supply device of claim 14, wherein the rectifier is a full-wave rectifier circuit.

17. The PWM control module of claim 14, wherein the AC-off state determined by the PWM control module comprises a short state of any one phase or short states of both phases of a plurality of AC input lines.

18. The PWM control module of claim 13, wherein the PWM control module is configured to reset a driving power of the power supply device based on a determination that the HV pin indicates the AC-off state, and keep the power supply device in a normal operation based on a determination that the HV pin indicates an AC-on state.

19. The PWM control module of claim 13, wherein the AC-off detector comprises:
a power source configured to supply current to the AC-off detector capacitor; and
a comparator configured to output an AC-off signal based on a source voltage of the power device being less than or equal to a reference voltage.

20. The PWM control module of claim 13, wherein the PWM control module is a monolithic integrated circuit.

21. A Pulse Width Modulation (PWM) control module for use in a power supply device, comprising:
a power device connected between an HV pin and a VCC pin;
a switch configured to selectively and directly connect between a terminal of the power device and the VCC pin;
an AC-off detector configured to sense an AC-off state based on a voltage at the terminal of the power device,
wherein the PWM control module further comprises:

a controller configured to sense the voltage of the VCC pin, turn off the switch based on the VCC voltage being greater than or equal to a reference value, and supply a HV voltage to the VCC pin by turning on the switch based on the VCC voltage being less than the reference value; and a timer that counts a discharge time of an AC-off detector capacitor.

* * * * *